United States Patent [19]

Earnshaw et al.

[11] Patent Number: 5,050,072
[45] Date of Patent: Sep. 17, 1991

[54] SEMAPHORE MEMORY TO REDUCE COMMON BUS CONTENTION TO GLOBAL MEMORY WITH LOCALIZED SEMAPHORES IN A MULTIPROCESSOR SYSTEM

[75] Inventors: William E. Earnshaw, N. Lauderdale; Steven J. McKinney, Coral Springs, both of Fla.

[73] Assignee: Modular Computer Systems, Inc., Fort Lauderdale, Fla.

[21] Appl. No.: 207,878

[22] Filed: Jun. 17, 1988

[51] Int. Cl.[5] ................ G06F 15/16; G06F 13/16
[52] U.S. Cl. ................... 364/200; 364/229; 364/228.1; 364/246.8
[58] Field of Search ... 364/200 MS File, 9000 MS File

[56] References Cited

U.S. PATENT DOCUMENTS

| | | | |
|---|---|---|---|
| 4,412,285 | 10/1983 | Neches | 364/200 |
| 4,570,217 | 2/1986 | Allen et al. | 364/900 |
| 4,574,350 | 3/1986 | Starr | 364/200 |
| 4,975,833 | 12/1990 | Jinzaki | 364/200 |

Primary Examiner—Lawrence E. Anderson
Attorney, Agent, or Firm—Spencer & Frank

[57] ABSTRACT

The invention greatly reduces common bus contention by allowing the semaphore test bit and set operations to be performed on each CPU's local bus. The semaphore lock bits are stored locally in high speed SRAM on each CPU, and coherency of the lock bits is maintained through a bus monitoring logic circuit on each CPU. A CPU wishing to take possession of a semaphore performs a local read of its semaphore memory, and spins locally until the lock bit is reset at which time it performs a local write to set the bit. When the semaphore lock bit is written, it will be updated locally, and at the same time the write operation will be sent out over the common bus. The bus monitoring logic on every other CPU will recognize the write operation and simultaneously update the corresponding lock bit in each local semaphore memory. This ability to read spin locally relieves the common bus from the great amount of traffic that occurs in typical systems that maintain the semaphore lock bits in common global memory.

3 Claims, 1 Drawing Sheet

SEMAPHORE MEMORY TO REDUCE COMMON BUS CONTENTION TO GLOBAL MEMORY WITH LOCALIZED SEMAPHORES IN A MULTIPROCESSOR SYSTEM

This invention generally relates to an apparatus used to support semaphore operations in a common bus, multiprocessor computer system.

BACKGROUND OF THE INVENTION

In a computer system which allows several processes to co-exist (e.g. a multi-tasking operating system or multi-processor system) a means to synchronize the processes is needed. The semaphore mechanism is a common approach to solving this need. Although the term semaphore has been used to describe several synchronization mechanisms we will use it only to mean the algorithms devised by E. W. Dijkstra.

The essence of Dijkstra's semaphores is a data structure and algorithm which control the use of resources. In computers semaphores are used to protect data structures in the computer's memory, to arbitrate the use of devices and to synchronize processes with external events.

Previous computer systems have implemented semaphores using a software or microcode algorithm. In multiprocessor systems the performance of the semaphore mechanism determines the degree of parallelism which can be achieved and thus the system performance.

Each semaphore includes a counter which describes the quantity of particular resources which are available, and if no resources are available it may include a list of processes waiting for a resource to be made available.

Dijkstra defined two operations which act on semaphores:

P(sema): Allocate a resource to the process. Blocking the process if necessary until a resource is available. While a process is blocked the processor may be running another process.

V(sema): Return a resource allocated using P to the pool of resources and if a process is waiting for the resource allocate the resource to that process that make it runable.

The P operation decrements the counter and then decides if it needs to block the process. The V operation increments the counter and decides if there is a process waiting to run. Semaphores have been implemented on existing systems using software to implement the algorithms. These algorithms are difficult to implement in software since the semaphore data structure itself is a resource which needs to be protected.

The normal hardware support commonly used to provide synchronization of semaphores is an indivisible memory read/modify/write operation. Software can build on this by repeatedly doing an indivisible test and set operation on a lock bit in memory until it finds that the bit was previously cleared. This is called a spin loop because contention for the lock bit is resolved by the processor spinning in a tight loop waiting for the resource to become available.

If a spin lock is used to protect the semaphore data structure, the semaphore operations are just the increment or decrement of the counter and manipulation of the list of processes waiting for the semaphore.

Semaphores implemented in software can degrade the performance of a multiprocessor computer system in several ways: Many semaphore operations per second can result in a high degree of contention for the common bus and therefore the semaphore operations can take a significant amount of time compared to the code which they protect. The indivisible bus operations can seriously affect the through-put of the system bus. The duration of the semaphore operation effects the contention for the semaphore itself.

SUMMARY OF THE INVENTION

In view of the above described difficulties with known prior art it is the object of the present invention to provide a computer architecture and method to relieve the common memory bus in a multiprocessor system from much of the high degree of data transfer due to semaphored data structures. To meet this object, the present invention provides a multiprocessor system employing a semaphore mechanism, comprising:

a global memory for storing semaphore protected data structures;

a plurality of CPU boards, each of the CPU boards containing a central processing unit and local memory for storing semaphores which are identical to semaphores stored in the local memory of each of the other of the CPU boards, each semaphore including a lock bit which can be set and reset in dependence of whether a data structure in global memory is being used by a one of the central processing units;

a common bus interconnecting the global memory and the plurality of CPU boards;

spin loop means in each central processing unit for gaining access to a given semaphore stored in local memory by continuously checking the status of the local lock bit associated with the given semaphore until it is determined that the local lock bit is reset, locking the common bus to prevent other central processing units from gaining access to the common bus, reading the local lock bit to ensure it is still reset, and thereafter setting the associated local lock bit for gaining access to the given semaphore; and bus monitoring logic means on each CPU board coupled to the central processing unit and the local memory of that CPU board for writing to the common bus the local set lock bit, and for monitoring the common bus for a set lock bit written to the common bus by another bus monitoring logic means on one of the other CPU boards and writing the set lock bit written onto the common bus by the other bus monitoring logic means into local memory to ensure coherency of the lock bits throughout the multiprocessor system.

The invention thus greatly reduces common bus contention by allowing the semaphore test bit and set operations to be performed on each CPU's local bus. The semaphore lock bits are stored locally in high speed SRAM on each CPU, and coherency of the lock bits is maintained through a bus monitoring logic circuit on each CPU.

A CPU wishing to take possession of a semaphore performs a local read of its semaphore memory, and spins locally until the lock bit is reset at which time it performs a local write to set the bit.

When the semaphore lock bit is written, it will be updated locally, and at the same time the write operation will be sent out over the common bus.

The bus monitoring logic on every other CPU will recognize the write operation and simultaneously update the corresponding lock bit in each local semaphore memory.

This ability to read spin locally relieves the common bus from the great amount of traffic that occurs in typical systems that maintain the semaphore lock bits in common global memory.

The invention will be more specifically described with relation to a preferred embodiment which is illustrated in the appended drawings.

DESCRIPTION OF THE PREFERRED EMBODIMENT

Figure 1:
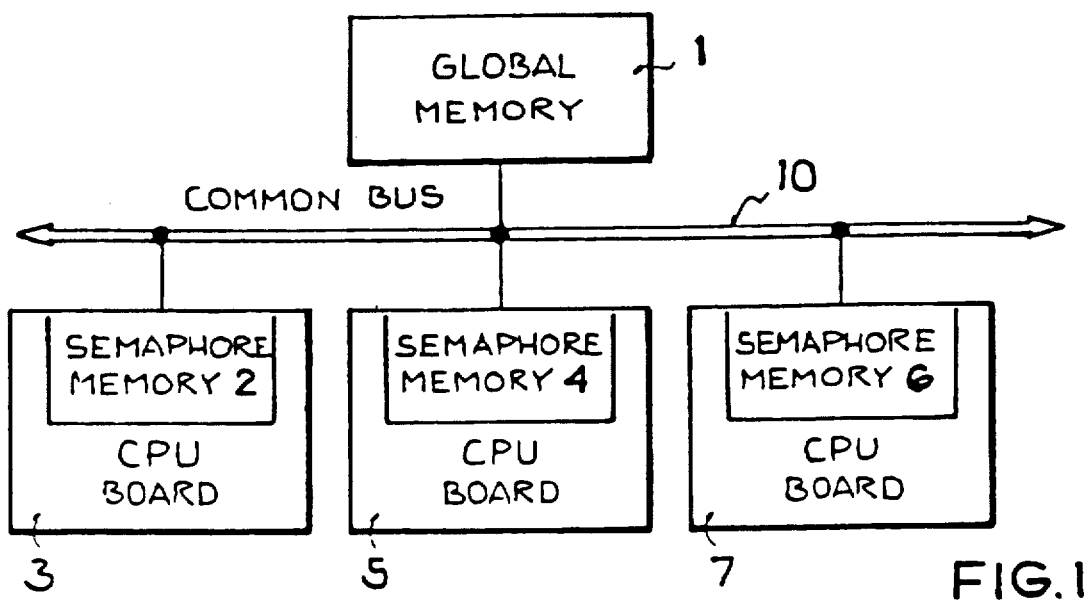
FIG. 1 shows a block diagram of a common bus multiprocessor computer system with semaphore memory logic circuits on each CPU board.
Figure 2:
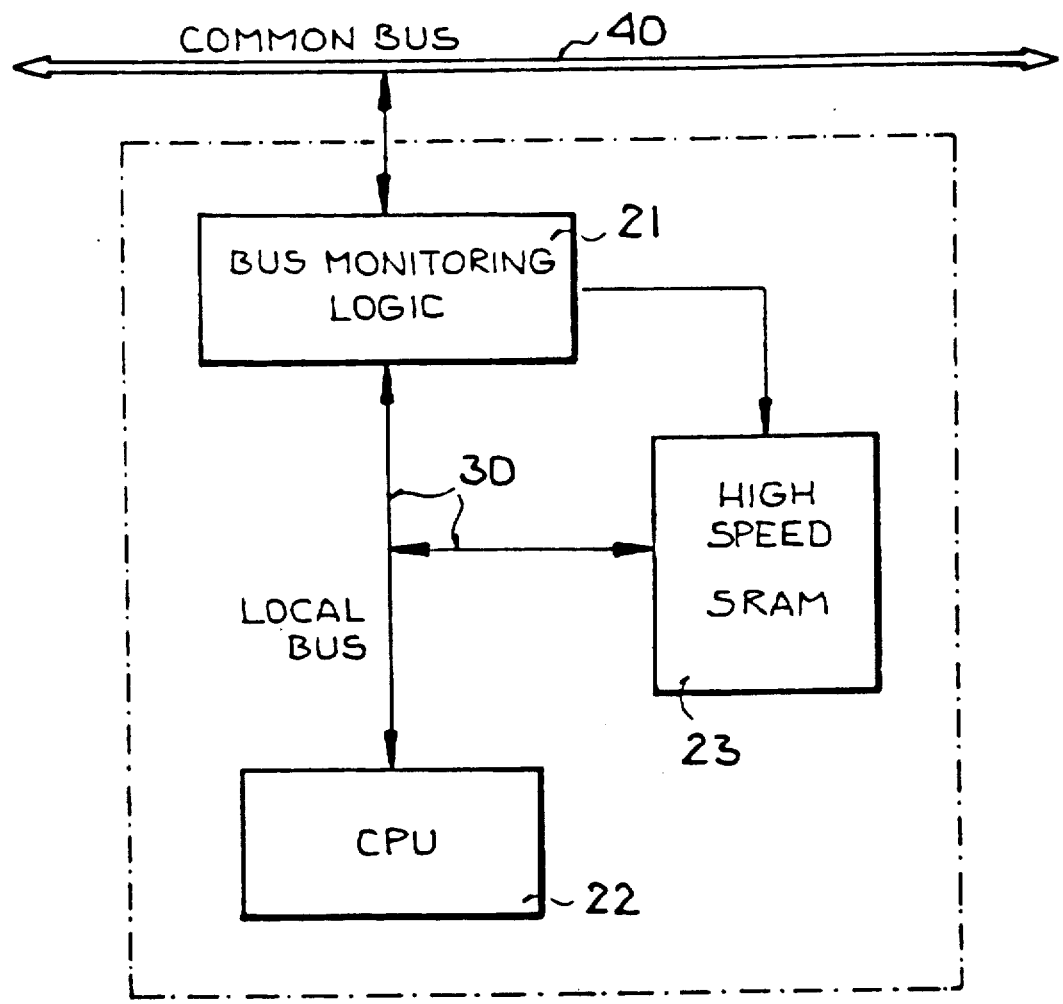
FIG. 2 shows a block circuit diagram of a CPU board containing semaphore memory logic consisting of bus monitoring logic for lock bit coherency and high speed SRAM for lock bit storage, constructed in accordance with an embodiment of the present invention.

FIG. 1 illustrates the preferred embodiment of the invention consisting of a semaphore memory 2, 4, 6 on every CPU board 3, 5, 7 in a multiprocessor system. FIG. 2 illustrates the organization of the semaphore memory which includes bus monitoring logic 21 and high speed SRAM 23.

In order to handle the concurrency condition of 2 or more CPU's attempting to gain access to the same semaphore at the same time, the spin loop is divided into two parts. A CPU wanting access to a semaphore performs a local read of the semaphore lock bit. If the bit is set, the CPU will spin locally, waiting for the bit to be reset. After the bit is reset, the CPU performs an indivisible read/modify/write operation by executing a locked test bit and set instruction.

This involves locking the common bus so that no other CPU can access it, reading the state of the semaphore lock bit to make sure it is still reset, and then setting the bit to gain access to the semaphore. If the bit was set by another CPU before the locked test and set could be performed, the CPU will again do a local read spin. The first CPU to gain locked access to the common bus will gain access to the semaphore.

This locked test and set operation is performed only after seeing that the semaphore has become avaiable.

The SRAM 23 is used to store the semaphore lock bits locally and contains semaphores identical to every other CPU's SRAM. When the CPU 22 wishes to gain access to a data structure in global memory protected by a semaphore it must first perform a test bit and set operation on the particular semaphore lock bit. It does this by reading the lock bit from the SRAM 23 and checking its status. If the bit is set, the semaphore protected data structure is in use by another CPU in the system. The CPU 22 will then spin in a tight loop until the bit is reset indicating the semaphore protected data structure is available.

When the lock bit is reset, the CPU 22 will set it and write it back to the SRAM 23. At the same time, the bus monitoring logic 21 will forward this write from the local bus 30 to the common bus 40.

The bus monitoring logic continually monitors the common bus 40 for writes to semaphore lock bits. Whenever a lock bit is written by any CPU, the bus monitoring logic 21 will write the same lock bit in its local SRAM 23. This ensures coherency of the lock bits throughout the system.

The bus monitoring logic 21 functions identically to the bus watching function implemented in common CACHE circuits and CACHE controllers found throughout the industry and can be implemented similarly with common CACHE components.

The SRAM can be implemented with any number of standard SRAM components with an access speed sufficient to handle the common bus 40 bandwith.

The machine instructions for causing the different read and write operations, the locks and semaphore operations depend on the type of microprocessor used. These instructions will be obvious to those skilled in the art of microprocessor programming. Therefore it is unnecessary to give a comprehensive list of microcode instructions. Furthermore it will be obvious to those skilled in the art that various modifications and changes may be made therein without departing from the invention.

What is claimed is:

1. A multiprocessor system employing a semaphore mechanism, comprising:
   a global memory for storing semaphore protected data structures;
   a plurality of CPU boards, each one of said CPU boards containing a central processing unit and local memory for storing semaphores which are identical to semaphores stored in the local memory of each of the other of said CPU boards, each semaphore including a lock bit which can be set and reset in dependence of whether a data structure in global memory is being used by a one of the central processing units;
   a common bus interconnecting said global memory and said plurality of CPU boards;
   spin loop means in each said central processing unit for gaining access to a given semaphore stored in local memory by continously checking the status of the local lock bit associated with the given semaphore until it is determined that the local lock bit is reset, locking the common bus to prevent other central processing units from gaining access to said common bus, reading the local lock bit to ensure it is still reset, and thereafter setting the associated local lock bit for gaining access to the given semaphore; and
   bus monitoring logic means on each said CPU board coupled to the central processing unit and the local memory of that CPU board for writing to said common bus the local set lock bit, and for monitoring the common bus for a set lock bit written to said common bus by another bus monitoring logic means on one of the other CPU boards and writing the set lock bit written onto said common bus by the other bus monitoring logic means into local memory to ensure coherency of the lock bits throughout said multiprocessor system.

2. The multiprocessor system according to claim 1, wherein each said local memory comprises an SRAM.

3. The multiprocessor system according to claim 1, further comprising a local bus on each respective CPU board interconnecting the central processing unit, local memory, and bus monitoring logic means on said respective CPU board, wherein the central processing unit on each said CPU board writes the local set lock bit to local memory by way of the local bus and said bus monitoring logic means monitors said local bus for the local set lock bit.

* * * * *